(12) United States Patent
Kuriya et al.

(10) Patent No.: US 12,533,764 B2
(45) Date of Patent: Jan. 27, 2026

(54) WORKPIECE DIAMETER MEASUREMENT METHOD AND MACHINE TOOL

(71) Applicant: DMG MORI CO., LTD, Nara (JP)

(72) Inventors: Tatsuhiko Kuriya, Nara (JP); Koji Iiyama, Nara (JP); Katsuhito Miyahara, Nara (JP)

(73) Assignee: DMG MORI CO., LTD., Nara (JP)

( * ) Notice: Subject to any disclaimer, the term of this patent is extended or adjusted under 35 U.S.C. 154(b) by 378 days.

(21) Appl. No.: 18/273,619

(22) PCT Filed: Jan. 22, 2021

(86) PCT No.: PCT/JP2021/002214
§ 371 (c)(1),
(2) Date: Jul. 21, 2023

(87) PCT Pub. No.: WO2022/157920
PCT Pub. Date: Jul. 28, 2022

(65) Prior Publication Data
US 2024/0075576 A1 Mar. 7, 2024

(51) Int. Cl.
*B23Q 17/20* (2006.01)
*G01B 5/08* (2006.01)

(52) U.S. Cl.
CPC .............. *B23Q 17/20* (2013.01); *G01B 5/08* (2013.01)

(58) Field of Classification Search
CPC . B23Q 17/20; G01B 5/08; G01B 5/10; G01B 5/12

(Continued)

(56) References Cited

U.S. PATENT DOCUMENTS 2,676,501 A * 4/1954 North ................ B23B 29/03428
279/6
2,863,223 A * 12/1958 Reicherter ............... G01B 5/08
33/555.1

(Continued)

FOREIGN PATENT DOCUMENTS

JP H04105851 A 4/1992
JP H05208350 A 8/1993

(Continued)

OTHER PUBLICATIONS

Extended European Search Report, European Patent Application No. 21920127.4, dated Oct. 10, 2024; 6 pages.

(Continued)

*Primary Examiner* — George B Bennett
(74) *Attorney, Agent, or Firm* — Stinson LLP (57) ABSTRACT

Disclosed is a workpiece diameter measurement method including the steps of: measuring coordinates of a point P that is on an outer circumferential surface of a cylindrical workpiece that is supported such that a rotary axis of a main spindle of a machine tool and a central axis of the cylindrical workpiece coincide with each other, the coordinates having a maximum or minimum coordinate in a first direction that is orthogonal to the rotary axis; calculating a distance D2 in the first direction between the point P and a reference point Q that is a point at which a distance D1 in the first direction from the rotary axis is known; and calculating a workpiece diameter of the cylindrical workpiece based on the distance D1 and the distance D2.

9 Claims, 5 Drawing Sheets

(58) Field of Classification Search
USPC .................................... 33/550, 551, 555.1
See application file for complete search history.

(56) References Cited

U.S. PATENT DOCUMENTS

| | | | | |
|---|---|---|---|---|
| 3,795,055 | A * | 3/1974 | Zucco | G01B 7/12 33/550 |
| 4,005,528 | A * | 2/1977 | Albertazzi | G01B 5/08 33/558 |
| 4,456,516 | A * | 6/1984 | Schaffner | C25F 7/00 451/17 |
| 4,562,392 | A | 12/1985 | Davis et al. | |
| 5,341,574 | A * | 8/1994 | Bieg | G01B 21/042 73/1.79 |
| 6,067,721 | A * | 5/2000 | Dall'Aglio | B24B 5/42 33/655 |
| 6,430,832 | B1 * | 8/2002 | Dall'Aglio | G01B 5/08 33/555.1 |
| 6,568,096 | B1 * | 5/2003 | Svitkin | B23Q 17/20 82/162 |
| 6,754,973 | B2 * | 6/2004 | Takahashi | G01B 5/08 33/553 |
| 7,197,837 | B1 * | 4/2007 | Blanford | G01B 5/003 33/555.1 |
| 7,392,595 | B2 * | 7/2008 | Heimann | G01M 17/10 33/550 |
| 7,461,462 | B2 * | 12/2008 | Bankestrom | G01B 21/30 33/550 |
| 8,725,446 | B2 * | 5/2014 | Wegmann | G01B 5/003 702/155 |
| 9,803,968 | B2 * | 10/2017 | Nakayama | G01B 5/201 |
| 10,132,622 | B2 * | 11/2018 | Ould | G01B 5/213 |
| 10,422,620 | B2 * | 9/2019 | Sato | G01B 5/012 |
| 10,442,008 | B2 * | 10/2019 | Haimer | B23B 31/11 |
| 11,041,707 | B2 * | 6/2021 | Omori | G01B 3/18 |
| 11,850,652 | B2 * | 12/2023 | Elford | B21D 15/00 |
| 2008/0201005 | A1 * | 8/2008 | Hon | G05B 19/401 700/109 |
| 2021/0055093 | A1 * | 2/2021 | Logan | G01B 5/08 |

FOREIGN PATENT DOCUMENTS

| | | |
|---|---|---|
| JP | 2000117629 A | 4/2000 |
| JP | 2010228013 A | 10/2010 |
| JP | 2015100903 A | 6/2015 |

OTHER PUBLICATIONS

International Search Report dated Apr. 20, 2021, International Application No. PCT/JP2021/002214, 8 pages.

Extended European Search Report, European Patent Application No. 219201297.4, dated Oct. 10, 2024; 6 pages.

* cited by examiner

WORKPIECE DIAMETER MEASUREMENT METHOD AND MACHINE TOOL

REFERENCE TO RELATED APPLICATION

This application is the 371 U.S. national stage application of International Application No. PCT/JP2021/002214, filed Jan. 22, 2021, the entire disclosures of which are incorporated herein by reference.

TECHNICAL FIELD

The present invention relates to a workpiece diameter measurement method and a machine tool.

BACKGROUND ART

In a machine tool such as a multi-processing machine or a turret lathe, for example, a cylindrical workpiece that is attached to a main spindle is ground by a grinding tool that is attached to a lower tool post. In the case of the cylindrical workpiece, the outer diameter of the workpiece is measured as needed to determine a ground state of the workpiece. The workpiece diameter of the cylindrical workpiece attached to the main spindle can be calculated by measuring the coordinates of three points along the outer circumference of the workpiece by using a contact type position detection sensor.

For example, Patent Literature 1 proposes a method for measuring inner and outer diameters of a circular workpiece, wherein the inner diameter or the outer diameter of the circular workpiece is calculated by, in a state in which two probes are provided at a reference position, moving a third probe from a predetermined position until the third probe and the two probes abut against an inner or outer circumferential surface of the workpiece, and multiplying a corrected value, which is obtained based on a moving distance of the third probe, by an actually measured value.

CITATION LIST

Patent Literature

[PTL 1] Laid-Open Patent Publication No. 2000-117629

SUMMARY OF INVENTION

Technical Problem

However, in the case where two probes and a third probe are used, many probes are required, which requires complex operations. Meanwhile, it is possible to measure the coordinates of three points along the outer circumference of the workpiece by using a contact type sensor attached to a tool main spindle (first tool post) or a tool post (second tool post). However, in order to ensure the accuracy of measurement, the distances between the three points are required to be not too small. In the case of measuring the coordinates of three points as described above, the tool main spindle or the lower tool post has to move a long distance, which increases the measurement time and results in inefficiency. In addition, the stroke length by which the tool main spindle, in particular, the lower tool post can move is limited, and thus target workpieces whose workpiece diameter can be measured with high accuracy are limited.

Solution to Problem

In view of the above, one aspect of the present invention relates to a workpiece diameter measurement method including the steps of: measuring coordinates of a point P that is on an outer circumferential surface of a cylindrical workpiece that is supported such that a rotary axis of a main spindle of a machine tool and a central axis of the cylindrical workpiece coincide with each other, the coordinates having a maximum or minimum coordinate in a first direction that is orthogonal to the rotary axis; calculating a distance D2 in the first direction between the point P and a reference point Q that is a point at which a distance D1 in the first direction from the rotary axis is known; and calculating a workpiece diameter of the cylindrical workpiece based on the distance D1 and the distance D2.

Another aspect of the present invention relates to a machine tool including: a main spindle that has a rotary axis; a sensor that calculates coordinates of a point P that is on an outer circumferential surface of a cylindrical workpiece that is supported such that the rotary axis and a central axis of the cylindrical workpiece coincide with each other, the coordinates having a maximum or minimum coordinate in a first direction that is orthogonal to the rotary axis, and coordinates of a reference point Q that is a point at which a distance D1 in the first direction from the rotary axis is known; and a computation unit that calculates a distance D2 in the first direction between the point P and the reference point Q based on the coordinates of the point P and the coordinates of the reference point Q, and also calculates a workpiece diameter of the cylindrical workpiece based on the distance D1 and the distance D2.

Advantageous Effects of Invention

According to the aspects of the present invention described above, it is possible to measure workpiece diameter rapidly with high accuracy.

DESCRIPTION OF EMBODIMENT

The term "machine tool" used in the following description refers to: for example, a lathe; a multi-processing machine that has a machining function that uses a fixed tool and a milling function that uses a rotary tool; a 5-axis processing machine that is controlled by using two or more rotary axes in addition to the X axis, the Y axis, and the Z axis; an additive manufacturing (AM) machine that can perform addition processing; or the like. However, the machine tool is not limited thereto.

A main spindle of a machine tool includes a jig such as a chuck for holding a workpiece. The main spindle causes the workpiece to rotate about a rotary axis that corresponds to the Z direction. The machine tool may include one main spindle and a tailstock, or may include two main spindles including a first main spindle and a second main spindle. The first main spindle and the second main spindle are provided such that the rotary axes thereof coincide with each other.

As used herein, the term "main spindle" refers to a structural body that includes a rotary axis Cc that imparts rotation to a workpiece, a motor, a transmission, and the like.

As used herein, the term "tool post" is a collective term for a tool main spindle (first tool post) to which a rotary tool is attached, a lower tool post (second tool post) to which a fixed tool is attached, and the like. The tool post is a structural body for attaching a grinding tool (bite). Examples of the tool post include a flat tool post, a comb blade tool post, a turret tool post, and the like. The tool main spindle is a structural body different from the main spindle that includes the rotary axis that corresponds to the Z direction.

As used herein, the term "workpiece" refers to a target object to be ground. Also, the term "workpiece diameter" refers to the diameter (or radius) of a cross section perpendicular to the central axis of the cylindrical workpiece.

A method for measuring workpiece diameter R (hereinafter also referred to as "workpiece diameter measurement method") according to an embodiment of the present invention includes the step (i) of measuring coordinates of a point P that is on an outer circumferential surface of a cylindrical workpiece that is supported such that a rotary axis Cc of a main spindle of a machine tool and a central axis of the cylindrical workpiece coincide with each other, the coordinates having a maximum or minimum coordinate in a first direction that is orthogonal to the rotary axis (hereinafter also referred to as "coordinates measuring step").

The point P is a point that is on the outer circumferential surface of a target portion of a workpiece whose workpiece diameter R needs to be measured, and is also on a circle (hereinafter referred to as "circle Cw") formed by a line of intersection of a plane that is perpendicular to the central axis of the workpiece and the outer circumferential surface of the workpiece. Also, the point P corresponds to an intersection of the circle Cw and a straight line that extends through the central axis of the workpiece in the first direction. The coordinates measuring step may be, for example, the step of continuously calculating coordinates near the point P along the circle Cw on the outer circumferential surface of the workpiece by using a contact type or non-contact type sensor.

An arc of the circle Cw for which coordinates are continuously calculated may have a central angle θ that is sufficiently large to detect the point P at which the coordinate in the first direction is maximum or minimum, and, for example, may have a central angle θ of 50 degrees or less or 30 degrees or less. By using a contact type sensor, the point P can be detected by continuously calculating coordinates while a probe of the sensor is moved along the arc. The calculation of coordinates may be performed by a computation unit that is associated with the sensor and the machine tool.

The first direction that is orthogonal to the rotary axis Cc may be any direction. However, from the viewpoint of easily identifying the direction, the first direction may be the vertical direction (or in other words, the X direction) or the horizontal direction (or in other words, the Y direction).

For example, the coordinates of the point P may be coordinates at which the coordinate in the X direction is minimum. In this case, the point P coincides with a point that is on a lowermost end of the target portion of the workpiece whose workpiece diameter needs to be measured. The point that is on the lowermost end can be measured quickly and easily by using a sensor provided below the workpiece. The arc for which coordinates are continuously calculated is selected from a lower portion of the workpiece so as to extend across the point P.

Alternatively, the coordinates of the point P may be coordinates at which the coordinate in the X direction is maximum. In this case, the point P coincides with a point that is on an uppermost end of the target portion of the workpiece whose workpiece diameter needs to be measured. The point that is on the uppermost end can be measured by using, for example, a sensor that is attached to the tool main spindle. The arc for which coordinates are continuously calculated is selected from an upper portion of the workpiece so as to extend across the point P.

Alternatively, the coordinates of the point P may be coordinates at which the coordinate in the Y direction is minimum or maximum. In this case, the point P coincides with a point that is on a most forward or rearward end of a portion of the workpiece whose workpiece diameter needs to be measured when the workpiece is viewed from the front.

Next, the workpiece diameter measurement method includes the step of calculating a distance D2 in the first direction between the point P and a reference point Q. The reference point Q may be a point at which a distance D1 in the first direction from the rotary axis Cc of the main spindle is known. For example, the sensor used to calculate the point P is moved. Then, the coordinates of the reference point Q are calculated, and the distance D2 is calculated based on the coordinates of the point P and the coordinates of the reference point Q.

Even when the same machine tool is used, the position of the rotary axis Cc varies over time due to various factors such as temperature and humidity. On the other hand, variation of the position of the rotary axis Cc is in conjunction with, for example, variation of the position of the main spindle, and thus a point that is on a member that constitutes the main spindle itself hardly varies relative to the rotary axis Cc. When such a point that hardly varies in position relative to the rotary axis Cc is set as the reference point Q, the distance D1 in the first direction between the rotary axis Cc and the reference point Q is always constant. By measuring the distance D1 and storing the actually measured value in a storage unit that is associated with the machine tool, the value of the distance D1 is known. The reference point Q may be, for example, a point that is on the chuck that is attached to the main spindle to hold the workpiece. For example, the reference point Q is a point that is on a circle (hereinafter referred to as "circle Cz") formed by a line of intersection of a plane that is perpendicular to the rotary axis Cc and the outer circumferential surface of the chuck.

The coordinates of the reference point Q may be calculated before or after the coordinates of the point P are calculated. For example, if the coordinates of the reference point Q are measured first, calculation of the coordinates of the point P and calculation of the distance D2 can be quickly performed. In addition, if the coordinates of the reference point Q are measured once, the same coordinates can be used when workpiece diameter measurement is performed a plurality of times. That is, if calibration for calculating the coordinates of the reference point Q is first performed by using a sensor, after that, by simply calculating the coordinates of the point P, workpiece diameter measurement can be performed a plurality of times.

The reference point Q does not necessarily need to be on the same straight line as the point P and the rotary axis when viewed from the Z direction. However, when the point P, the reference point Q, and the rotary axis are on the same straight line, the moving distance of the sensor can be shortened, and the workpiece diameter can be measured more efficiently. That is, when the point P is located at coordinates at which the coordinate in the X direction is minimum, the reference point Q is preferably a point that is on the circle Cz and at which the coordinate in the X direction is minimum (for example, a point that is on the lowermost end of the chuck). When the point P is located at coordinates at which the coordinate in the X direction is maximum, the reference point Q is preferably a point that is on the circle Cz and at which the coordinate in the X direction is maximum (for example, a point that is on the uppermost end of the chuck).

Next, the workpiece diameter measurement method includes the step of calculating the workpiece diameter of the cylindrical workpiece based on the distance D1 and the distance D2. The calculation may be performed by a computation unit that is associated with the machine tool.

The sensor for detecting the coordinates of the point P and the sensor for detecting the coordinates of the reference point Q may be provided anywhere within the machine tool or outside the machine tool. The sensor for detecting the coordinates of the point P and the sensor for detecting the coordinates of the reference point Q may be the same. The sensor may be provided, for example, in a structural body that is movable within a plane that is orthogonal to the rotary axis. The structural body may be, for example, a first tool post or a second tool post included in the machine tool such as a multi-processing machine or a lathe. The first tool post may be a tool main spindle, and the second tool post may be a lower tool post such as a turret. The structural body may also be a rest, a tailstock, or the like.

The rest is a structural body for supporting a workpiece that is fixed to a grinder, a lathe, or the like in the radius direction. The tailstock is a structural body that includes a member that is pressed against a workpiece to stabilize the workpiece.

In the case where the sensor is attached to the tool main spindle, for example, a changing operation of changing the tool and the sensor by using an ATC (automatic tool changer) may be performed. However, the changing operation requires a certain amount of time. On the other hand, in the case where the sensor is attached to the lower tool post such as a turret, the changing operation performed by using an ATC is not required. When a tool and a sensor are attached in advance, by simply rotating the turret, the tool and the sensor can be changed.

Usually, the lower tool post has a small stroke in the X direction (vertical direction) and the Y direction (horizontal forward-rearward direction), and thus the distance by which the lower tool post can move is limited. However, the central angle θ of the arc of the circle Cw for which coordinates are continuously calculated to calculate the coordinates of the point P is sufficiently small. Accordingly, no problem occurs even when the lower tool post has a small stroke of movement.

The machine tool according to the embodiment of the present invention is a machine tool suitable for carrying out the workpiece diameter measurement method described above, and includes: a main spindle that has a rotary axis; a sensor; and a computation unit. The sensor may be a contact type or non-contact type sensor. The sensor calculates coordinates of a point P that is on an outer circumferential surface of a cylindrical workpiece that is supported such that a rotary axis Cc that corresponds to the Z direction and a central axis of the cylindrical workpiece coincide with each other, the coordinates having a maximum or minimum coordinate in a first direction that is orthogonal to the rotary axis Cc. Also, the sensor calculates coordinates of a reference point Q that is a point at which a distance D1 in the first direction from the rotary axis Cc is known. The computation unit calculates a distance D2 in the first direction between the point P and the reference point Q based on the coordinates of the point P and the coordinates of the reference point Q. The computation unit further calculates a workpiece diameter R of the cylindrical workpiece based on the distance D1 and the distance D2.

Hereinafter, an embodiment of the workpiece diameter measurement method and the machine tool according to the present invention will be described more specifically with reference to the accompanying drawings. In the drawings, in order to clearly show the shapes or the features of the constituent components of the machine tool, the constituent components of the machine tool are illustrated in relative dimensions. However, the dimensions are not necessarily in actual scale. Also, in the drawings, the same constituent components are given the same reference numerals.

Figure 1:
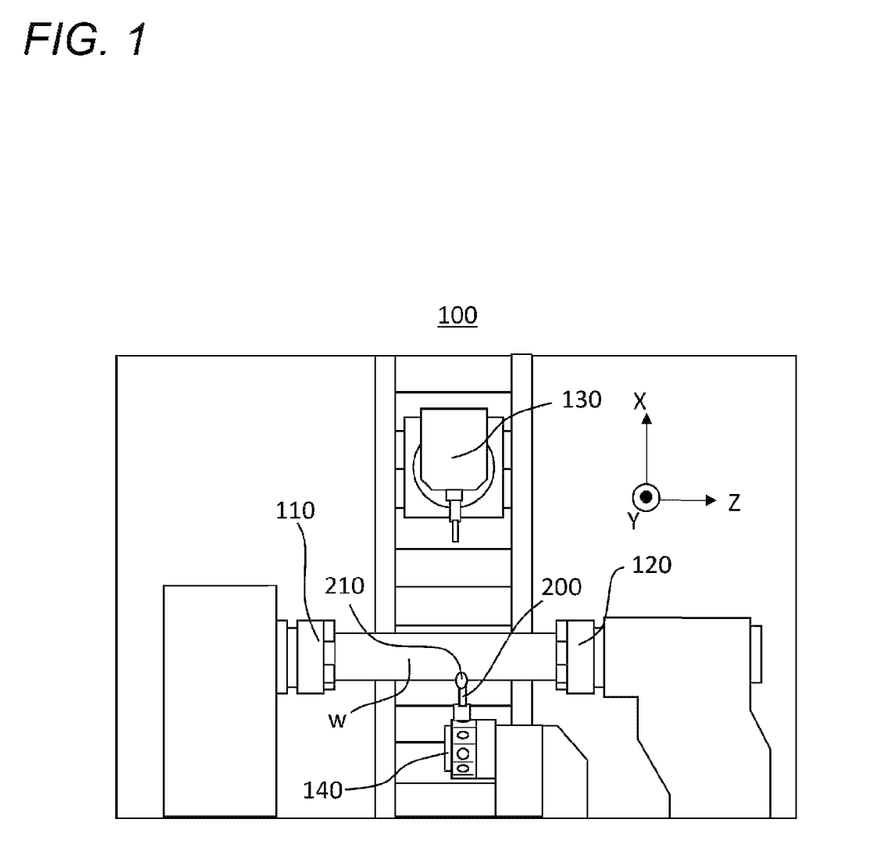
FIG. 1 is a front view showing an example of a configuration of a machine tool according to an embodiment of the present invention.
Figure 2:
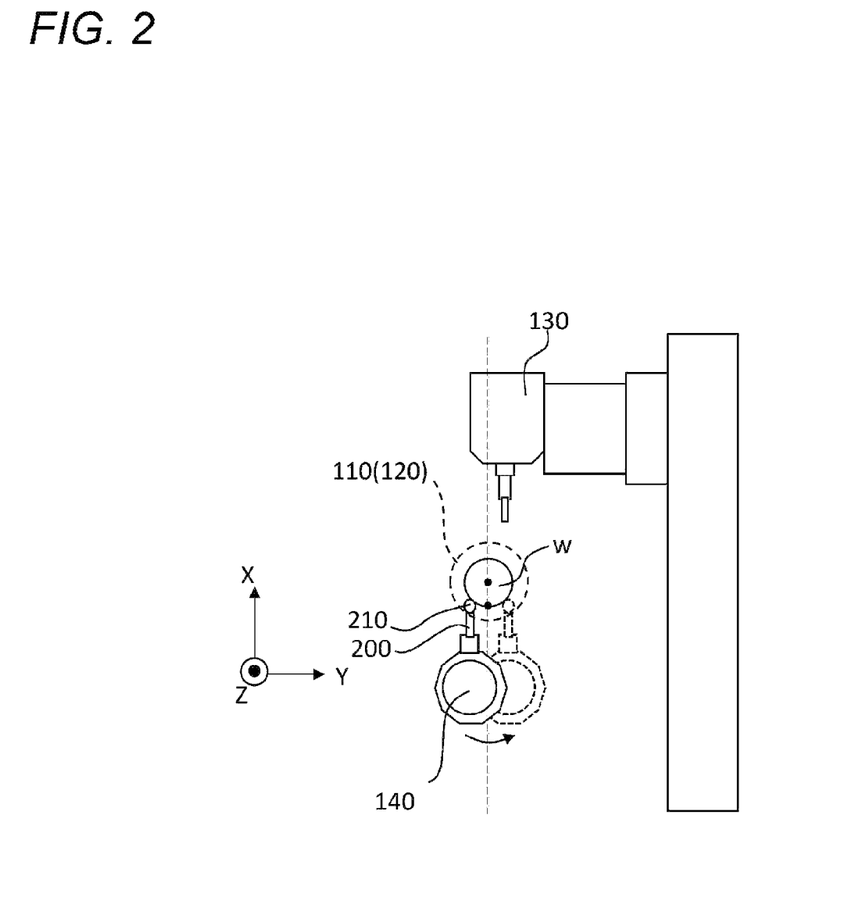
FIG. 2 is a conceptual diagram showing a workpiece, a main spindle, and first and second tool posts in the machine tool shown in FIG. 1 when viewed from the Z direction.

FIG. 1 is a front view showing an example of a configuration of a machine tool according to the embodiment of the present invention. FIG. 2 is a conceptual diagram showing a workpiece, a main spindle, and first and second tool posts in the machine tool shown in FIG. 1 when viewed from the Z direction.

As shown in FIGS. 1 and 2, a machine tool 100 includes a first main spindle 110 that has a rotary axis and a second main spindle 120 that has a rotary axis and is provided at an opposing position to the first main spindle 110. The first main spindle 110 includes a chuck for holding one end of a cylindrical workpiece W in the central axis direction, and the second main spindle 120 includes a chuck for holding the other end of the cylindrical workpiece W in the central axis direction. In FIG. 2, the position of the chuck included in the first main spindle 110 or the second main spindle 120 is indicated by a broken line. Each main spindle causes the workpiece W to rotate about the rotary axis. Here, the machine tool 100 that includes the second main spindle 120 is shown. However, the machine tool may include, for example, a tailstock instead of the second main spindle. A tool main spindle 130 (first tool post) that is movable three-dimensionally in the X, Y, and Z directions is provided above the workpiece W. Also, a turret 140 (second tool post) is provided below the workpiece W. That is, the machine tool 100 is a multi-processing machine that has a machining function that uses a tool fixed to the turret 140 and a milling function that uses a rotary tool attached to the tool main spindle 130. A contact type sensor 200 is attached to the turret 140. The first main spindle 110, the second main spindle 120, the tool main spindle 130, and the turret 140 are placed on a bed (not shown) installed on the floor.

The bed is equipped with a movement mechanism (a guide rail, a ball screw, and the like) for moving the turret 140 in three directions including the X, Y, and Z directions. As a result of the turret 140 being moved in the X direction and the Y direction, a probe 210 of the contact type sensor 200 moves along the circumferential surface of the workpiece W.

Figure 3:
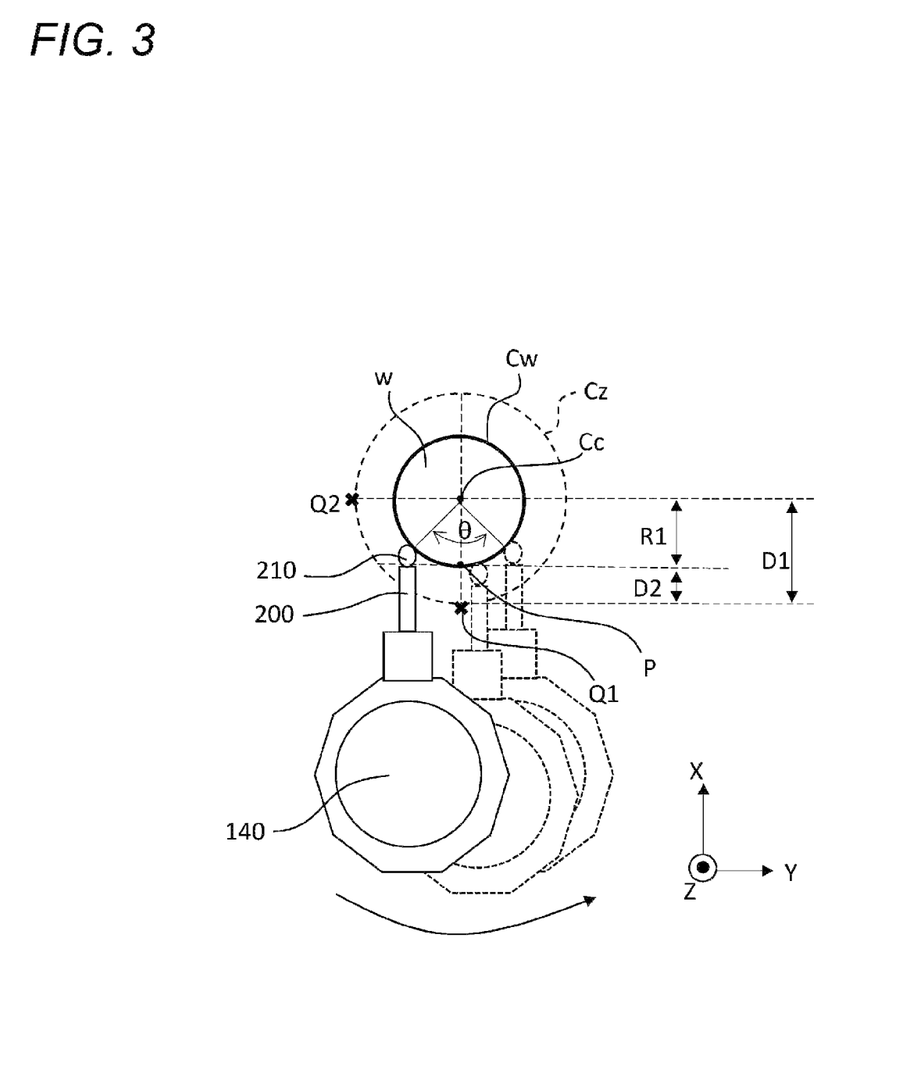
FIG. 3 is a diagram showing the step of measuring coordinates of a point P that is on an outer circumferential surface of a cylindrical workpiece, the coordinates having a minimum coordinate in the X direction that is orthogonal to the rotary axis.
Figure 4:
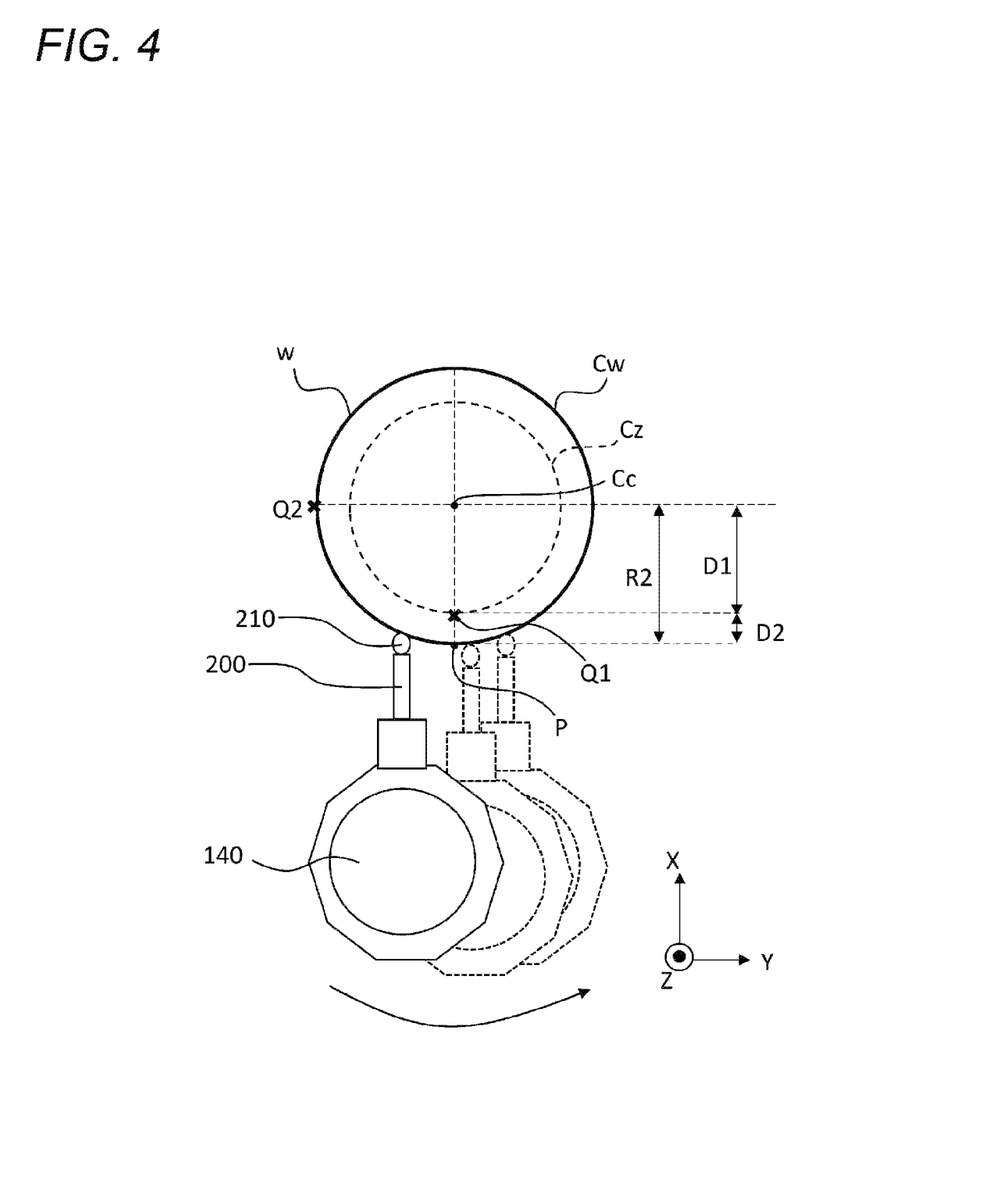
FIG. 4 is a diagram showing the step of measuring coordinates of a point P that is on an outer circumferential surface of another cylindrical workpiece, the coordinates having a minimum coordinate in the X direction that is orthogonal to the rotary axis.

FIGS. 3 and 4 are diagrams each showing the step of measuring coordinates of a point P that is on an outer circumferential surface of a cylindrical workpiece W, the coordinates having a minimum coordinate in the X direction that is orthogonal to the rotary axis Cc. In FIG. 3, the workpiece W has a diameter smaller than that of the chucks of the first and second main spindles 110 and 120 to hold the workpiece. In FIG. 4, the workpiece W has a diameter larger than that of the chucks.

The rotary axes of the first and second main spindles 110 and 120 coincide with the central axis of the cylindrical workpiece W. The circle Cw is a circle formed by a line of intersection of a plane that is perpendicular to the central axis of the workpiece W and the outer circumferential surface of the workpiece. The circle Cz indicated by a broken line is a circle formed by a line of intersection of a plane that is perpendicular to the rotary axis Cc and the outer circumferential surfaces of the chucks. The point P is a point that is on the circle Cw, and is also a lowermost end of the workpiece at which the coordinate in the X direction is minimum. The contact type sensor 200 moves along the arc of the central angle θ across the point P and continuously detects coordinates near the point P. The detected coordinates are calculated into a parameter by a predetermined computation unit.

Reference points Q1 and Q2 are points on the circle Cz. A distance D1 from the rotary axis Cc to the reference point Q1 or Q2 in the X direction and the Y direction is known. The distance D1 hardly varies even when conditions such as temperature and humidity vary. The chuck diameter may vary slightly due to temperature changes, but the variation is negligible. The distance between the reference point Q2 and the point P in the X direction does not vary even if the chuck diameter varies significantly. The reference point Q1 is on the same straight line as the point P and the rotary axis Cc when viewed from the Z direction.

First, the coordinates of the reference point Q are detected by using the sensor 200, and a parameter of the detected coordinates is calculated by the computation unit. After that, the coordinates of the point P are detected, and a parameter of the detected coordinates is calculated by the computation unit. A distance D2 is calculated by the computation unit based on the calculated parameters.

In the case where the rotary axes of the first and second main spindles 110 and 120 do not coincide with the Z direction due to the accuracy of assembling the machine tool, the amount of misalignment may be measured and reflected to the distance calculation processing performed by the computation unit.

Next, in the case of FIG. 3, a workpiece diameter R1 of the cylindrical workpiece W is calculated by the computation unit by subtracting the distance D2 from the distance D1. In the case of FIG. 4, a workpiece diameter R2 is calculated by the computation unit by adding the distance D1 and the distance D2.

Figure 5:
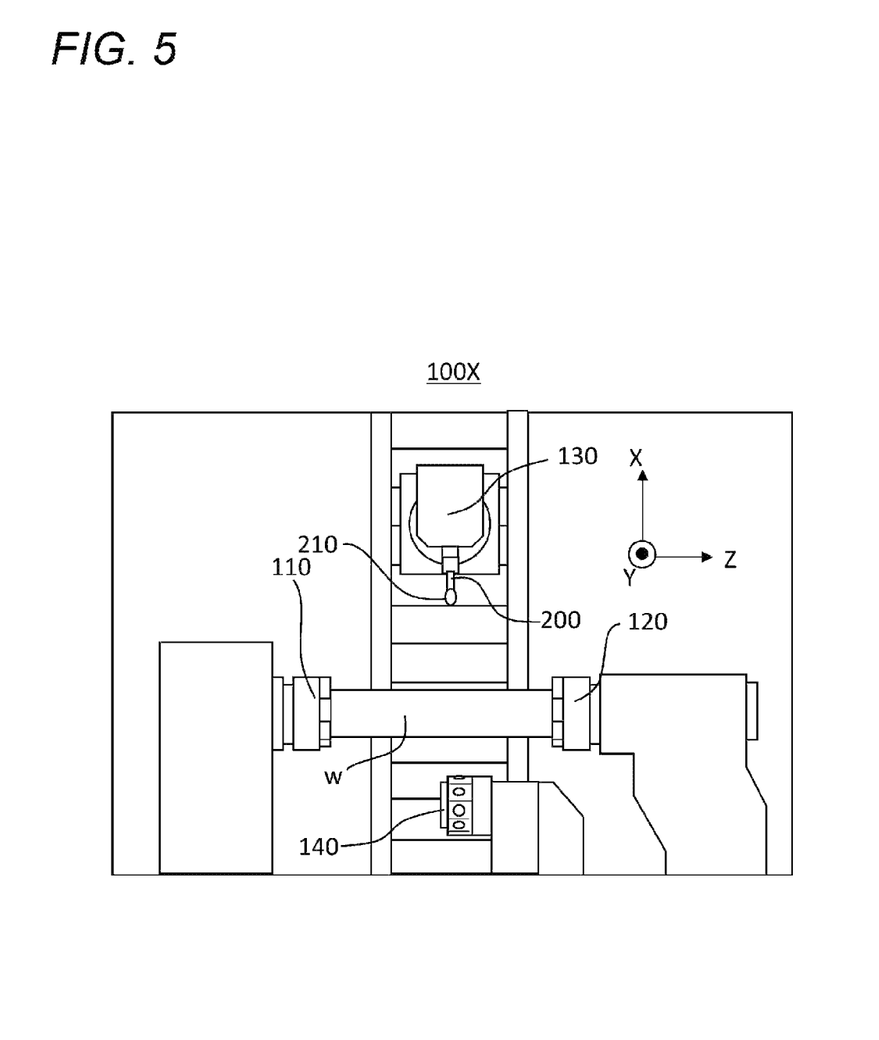
FIG. 5 is a front view showing an example of a configuration of a machine tool according to another embodiment of the present invention.

FIG. 5 is a front view showing an example of a configuration of a machine tool 100X according to another embodiment of the present invention. In the machine tool 100X, the sensor 200 is attached to the tool main spindle 130 instead of the turret 140. As a result of an ATC changing the tool and the sensor, the sensor 200 is attached to the tool main spindle 130. Other than the above, the configuration of the machine tool 100X is the same as that of the machine tool 100 shown in FIG. 1. In the case of the machine tool 100X, for example, a point that is on the uppermost end of the workpiece at which the coordinate in the X direction is maximum may be detected as the point P.

The description of the embodiment given above is exemplary in all aspects, and thus should not be construed as limiting. Modifications and changes can be made as appropriate by a person having ordinary skill in the art. The scope of the invention of the present application is indicated by the appended claims rather than the embodiment given above. Furthermore, changes that come within the scope of the claims and the range of equivalency are intended to be embraced within the scope of the invention of the present application.

INDUSTRIAL APPLICABILITY

The workpiece diameter measurement method according to the present invention is suitable when measuring the diameter or the radius of a cylindrical workpiece in a machine tool such as a lathe or a multi-processing machine.

REFERENCE SIGNS LIST 100, 100X machine tool
110 first main spindle
120 second main spindle
130 tool main spindle
140 turret
200 sensor
210 probe
W workpiece
R1, R2 workpiece diameter
P maximum point or minimum point
Q reference point
Cc rotary axis
Cw circle formed by line of intersection of plane perpendicular to central axis of workpiece W and outer circumferential surface of workpiece W
Cz circle formed by line of intersection of plane perpendicular to rotary axis Cc and outer circumferential surface of chuck

The invention claimed is:

1. A workpiece diameter measurement method comprising the steps of:
   measuring coordinates of a point P that is on an outer circumferential surface of a cylindrical workpiece that is supported such that a rotary axis of a main spindle of a machine tool and a central axis of the cylindrical workpiece coincide with each other, while a sensor is moved in a first direction and a second direction that are orthogonal to the rotary axis and orthogonal to each other, the coordinates having a maximum or minimum coordinate in the first direction that is orthogonal to the rotary axis, with respect to change of coordinate in the second direction;
   calculating a distance D2 in the first direction between the point P and a reference point Q that is a point at which a distance D1 in the first direction from the rotary axis is known; and
   calculating a workpiece diameter of the cylindrical workpiece based on the distance D1 and the distance D2.

2. The workpiece diameter measurement method in accordance with claim 1,
   wherein the reference point Q is on the same straight line as the point P and the rotary axis when viewed from a Z direction corresponding to the rotary axis.

3. The workpiece diameter measurement method in accordance with claim 1, wherein the first direction is an X direction that corresponds to the vertical direction or a Y direction that corresponds to the horizontal direction.

4. The workpiece diameter measurement method in accordance with claim 3,
wherein the coordinates of the point P has a minimum coordinate in the X direction.

5. The workpiece diameter measurement method in accordance with claim 3,
wherein the sensor is attached to a structural body that is movable within a plane that is orthogonal to the rotary axis.

6. The workpiece diameter measurement method in accordance with claim 5,
wherein the structural body is a first tool post or a second tool post of a multi-processing machine or a lathe.

7. The workpiece diameter measurement method in accordance with claim 1,
wherein the reference point Q is on a chuck that is attached to the main spindle to hold the workpiece.

8. A machine tool comprising:
a main spindle that has a rotary axis;
a sensor that is movable in a first direction and a second direction that are orthogonal to the rotary axis and orthogonal to each other, and calculates coordinates of a point P that is on an outer circumferential surface of a cylindrical workpiece that is supported such that the rotary axis and a central axis of the cylindrical workpiece coincide with each other, the coordinates having a maximum or minimum coordinate in the first direction, with respect to change of coordinate in the second direction, and coordinates of a reference point Q that is a point at which a distance D1 in the first direction from the rotary axis is known; and
a computation unit that calculates a distance D2 in the first direction between the point P and the reference point Q based on the coordinates of the point P and the coordinates of the reference point Q, and also calculates a workpiece diameter of the cylindrical workpiece based on the distance D1 and the distance D2.

9. The workpiece diameter measurement method in accordance with claim 1, wherein measuring of the coordinates of the point P is performed while the sensor is moved along an intersection between a plane perpendicular to the central axis and the outer circumferential surface.

* * * * *